United States Patent
Morimoto et al.

(10) Patent No.: US 7,042,740 B2
(45) Date of Patent: May 9, 2006

(54) SOFT-SWITCHING HALF-BRIDGE INVERTER POWER SUPPLY SYSTEM

(75) Inventors: Keiki Morimoto, Osaka (JP); Toshimitsu Doi, Osaka (JP); Kazuhiro Tanaka, Osaka (JP); Hirokazu Ioroi, Osaka (JP); Haruhiko Manabe, Osaka (JP)

(73) Assignee: Daihen Corporation, Osaka (JP)

( * ) Notice: Subject to any disclaimer, the term of this patent is extended or adjusted under 35 U.S.C. 154(b) by 0 days.

(21) Appl. No.: 11/063,822

(22) Filed: Feb. 23, 2005

(65) Prior Publication Data

US 2005/0190583 A1    Sep. 1, 2005

(30) Foreign Application Priority Data

Mar. 1, 2004    (JP) .............................. 2004-055909
Oct. 1, 2004    (JP) .............................. 2004-289719

(51) Int. Cl.
*H02M 3/335*    (2006.01)
*H02M 7/538*    (2006.01)

(52) U.S. Cl. ....................... 363/24; 363/56.07; 363/134

(58) Field of Classification Search .................. 363/24, 363/25, 56.06, 56.07, 134, 133

See application file for complete search history.

(56) References Cited

U.S. PATENT DOCUMENTS

| | | | | |
|---|---|---|---|---|
| 4,334,263 A | * | 6/1982 | Adachi | 363/25 |
| 4,336,587 A | * | 6/1982 | Boettcher et al. | 363/134 |
| 4,550,364 A | * | 10/1985 | Shaw | 363/24 |
| 4,794,506 A | * | 12/1988 | Hino et al. | 363/25 |
| 4,908,857 A | * | 3/1990 | Burns et al. | 379/418 |
| 5,781,419 A | * | 7/1998 | Kutkut et al. | 363/17 |
| 5,883,793 A | * | 3/1999 | Farrington | 363/16 |
| 6,055,161 A | * | 4/2000 | Church et al. | 363/22 |
| 6,349,044 B1 | * | 2/2002 | Canales-Abarca et al. | 363/17 |
| 2003/0156435 A1 | | 8/2003 | Morimoto et al. | |

* cited by examiner

*Primary Examiner*—Bao Q. Vu
(74) *Attorney, Agent, or Firm*—Hamre, Schumann, Mueller & Larson, P.C.

(57) ABSTRACT

An inverter power supply system includes a half-bridge inverter circuit which includes a first switching element, a second switching element, a first auxiliary capacitor and a second auxiliary capacitor for converting a DC voltage from a DC power supply circuit to an AC voltage. An output control circuit outputs a first output control signal and a second output control signal with a phase difference of a half cycle to control the inverter circuit. An inverter driving circuit turns on the first (or second) switching element when the first (or second) output control signal turns ON while turning off the first (or second) switching element upon lapse of a first (or second) delay time for allowing the first (or second) auxiliary capacitor to discharge to a predetermined level after the first (or second) output control signal turns OFF.

11 Claims, 10 Drawing Sheets

SOFT-SWITCHING HALF-BRIDGE INVERTER POWER SUPPLY SYSTEM

TECHNICAL FIELD

The present invention relates to a technique for reducing the switching loss of an inverter unit. Typically, such switching loss is generated when a DC voltage is converted into a high-frequency AC voltage by switching elements in an arc-processing power supply system for e.g. arc-welding or arc-cutting or in an inverter power supply system for supplying high-frequency power to a plasma processing apparatus.

BACKGROUND ART

FIG. 10 of the accompanying drawings shows the circuit arrangement of a conventional arc-processing power supply system utilizing a full-bridge inverter circuit. As shown in this figure, the conventional power supply system comprises a first through an eighth switching elements TR1–TR8. The third switching element TR3 and the fourth switching element TR4, as power supply switching elements, are alternately brought into and out of conduction to control the supply of DC voltage from an DC power supply circuit which includes an AC power source, a rectifying circuit DR7 and two smoothing capacitors C1, C2. When each of the switching elements TR1, TR2, TR5, TR6 of the full-bridge inverter circuit is turned off, an auxiliary capacitor C5 is charged to a high voltage by the energy of the leakage inductance of a main transformer INT, so that the voltage across the capacitor C5 may exceed the rated voltage of the respective switching elements TR1, TR2, TR5 and TR6 of the full-bridge inverter circuit. The other two switching elements TR7, T8 are surge voltage bypass elements provided for bypassing the charge voltage of the auxiliary capacitor C5 to the first and second smoothing capacitor C1, C2 to prevent the generation of such a high voltage.

The auxiliary capacitor C5 enables each of the first to sixth switching elements TR1–TR6 to switch at zero voltage. After each of the third and fourth switching elements TR3, TR4 are turned off, the auxiliary capacitor C5 continues to discharge a stored charge, and the corresponding ones of the switching elements TR1, TR2, TR5, TR6 of the inverter circuit are turned off when the voltage of the auxiliary capacitor C5 becomes zero, whereby turning-off at zero voltage is possible. Further, by the provision of the auxiliary capacitor C5, the voltage applied to the third switching element TR3 and the fourth switching element TR4 becomes zero, which enables switching of these switching elements at zero voltage.

The conventional arc-processing power supply system additionally comprises a main transformer INT, a secondary rectifier diode DR8, a DC reactor DCL, a secondary current detector ID, a comparison circuit ER, an output control circuit SC, an inverter driving circuit SRC, and a power switching circuit HR, and a power switching circuit HRC. The structure and function of these additional components are fully described in U.S. Patent Application Publication No. 2003/0156435A1, which is incorporated herein by reference.

In the prior-art full-bridge inverter circuit adapted for high voltage, the overall structure is considerably complicated, whereby the size of the system is increased, resulting in an increase in the cost. Moreover, the control circuit becomes complicated because of the complicated structure.

DISCLOSURE OF THE INVENTION

It is therefore an object of the present invention to provide an inverter power supply system which requires a simplified structure and simplified control for operation.

According to the present invention, an inverter power supply system comprises: a DC power supply circuit for outputting a smoothed DC voltage; a half-bridge inverter circuit for converting the DC voltage from the power supply circuit to an AC voltage, the inverter circuit including a first switching element, a second switching element, a first auxiliary capacitor and a second auxiliary capacitor; an output control circuit for outputting a first output control signal and a second output control signal with a phase difference of a half cycle to control the inverter circuit; and a power output circuit for converting the AC voltage from the inverter circuit into an output power. A third switching element is provided between a positive side of the DC power supply circuit and the inverter circuit for interruptively supplying the DC voltage to the first switching element. A fourth switching element is provided between a negative side of the DC power supply circuit and the inverter circuit for interruptively supplying the DC voltage to the second switching element. A power switching circuit brings the third switching element into and out of conduction in response to an ON/OFF state of the first output control signal while also bringing the fourth switching element into and out of conduction in response to an ON/OFF state of the second output control signal. An inverter driving circuit turns on the first switching element when the first output control signal turns ON while turning off the first switching element upon lapse of a first delay time for allowing the first auxiliary capacitor to discharge to a predetermined level after the first output control signal turns OFF. Further, the inverter driving circuit also turns on the second switching element when the second output control signal turns ON while turning off the second switching element upon lapse of a second delay time for allowing the second auxiliary capacitor to discharge to a predetermined level after the second output control signal turns OFF.

According to the above-described structure, a half-bridge inverter circuit is used instead of a full-bridge inverter circuit, so that the overall circuit structure and the control therefor can be simplified. Moreover, similarly to the prior art system, each switching element of the inverter circuit is shifted from conduction to interruption after the supply of DC voltage from the DC power supply circuit is interrupted. Therefore, the switching element of the inverter circuit is turned off at zero voltage, whereby the turn-off loss is considerably reduced. As a result, the switching frequency can be increased, while the size of the power supply system can be reduced, which leads to a reduction in size and weight of the system.

Preferably, the inverter driving circuit comprises a first delay circuit for setting the first delay time, and a second delay circuit for setting the second delay time.

Preferably, the inverter driving circuit further comprises a first OR circuit which supplies an ON signal to the first switching element if the first control signal or a first delay signal from the first delay circuit is ON, wherein the first delay circuit starts generating the first delay signal when the first control signal turns OFF. The inverter driving circuit further comprises a second OR circuit which supplies an ON signal to the second switching element if the second control signal or a second delay signal from the second delay circuit is ON, wherein the second delay circuit starts generating the second delay signal when the second control signal turns OFF.

In one embodiment, the inverter power supply system further comprises a first voltage detector for detecting a discharge voltage across the first auxiliary capacitor, and a second voltage detector for detecting a discharge voltage across the second auxiliary capacitor. In this case, the first delay circuit starts generating a first delay signal when the first control signal turns OFF while stopping generation of the first delay signal when the first discharge voltage becomes no more than a first threshold. Further, the second delay circuit starts generating a second delay signal when the second control signal turns OFF while stopping generation of the second delay signal when the second discharge voltage becomes no more than a second threshold.

In another embodiment, the inverter power supply system further comprises a current detector for detecting a primary current outputted from the inverter circuit, wherein the first delay circuit and the second delay circuit determines the first delay time and the second delay time, respectively, according to a value of the detected primary current.

Preferably, the inverter power supply system further comprises a first reverse charge preventing diode arranged between an intermediate point of the DC power supply circuit and an emitter side of the third switching element for preventing the first auxiliary capacitor from being reversely charged, and a second reverse charge preventing diode arranged between the intermediate point of the DC power supply circuit and a collector side of the fourth switching element for preventing the second auxiliary capacitor from being reversely charged.

Preferably, the power output circuit comprises a main transformer for transforming the AC voltage from the inverter circuit into a high-frequency AC voltage, and a secondary rectifier circuit for rectifying the high-frequency AC voltage from the main transformer to provide an output DC voltage suitable for supply to a target load.

The inverter power supply system may further comprise a secondary current detector for detecting a secondary current outputted from the main transformer. In this case, the output control circuit generates the first and second control signals based on the detected secondary current from the secondary current detector.

Alternatively, the inverter power supply system may further comprise a secondary voltage detector for detecting a secondary voltage across the load. In this case, the output control circuit generates the first and second control signals based on the detected secondary voltage from the secondary voltage detector.

The power output circuit may comprise a secondary rectifier/smoothing circuit for rectifying and smoothing the AC voltage from the inverter circuit to provide a DC voltage from which ripple components have been removed, and a power conversion circuit for converting the DC voltage from secondary rectifier/smoothing circuit into output power suitable for a target load. In this case, the power conversion circuit may comprise a power detection circuit for detecting traveling wave power absorbed by the load and reflective wave power reflected by the load, wherein the output control circuit generates the first and second output signals based on the traveling wave power and the reflective wave power from the power detection circuit.

Other features and advantages of the present invention will become clear from the following description of the preferred embodiments of the present invention given with reference to the accompanying drawings.

BEST MODE FOR CARRYING OUT THE INVENTION

Reference is now made to FIGS. 1 through 9 of the accompanying drawings for describing the preferred embodiments of the present invention.

EMBODIMENT 1

Figure 1:
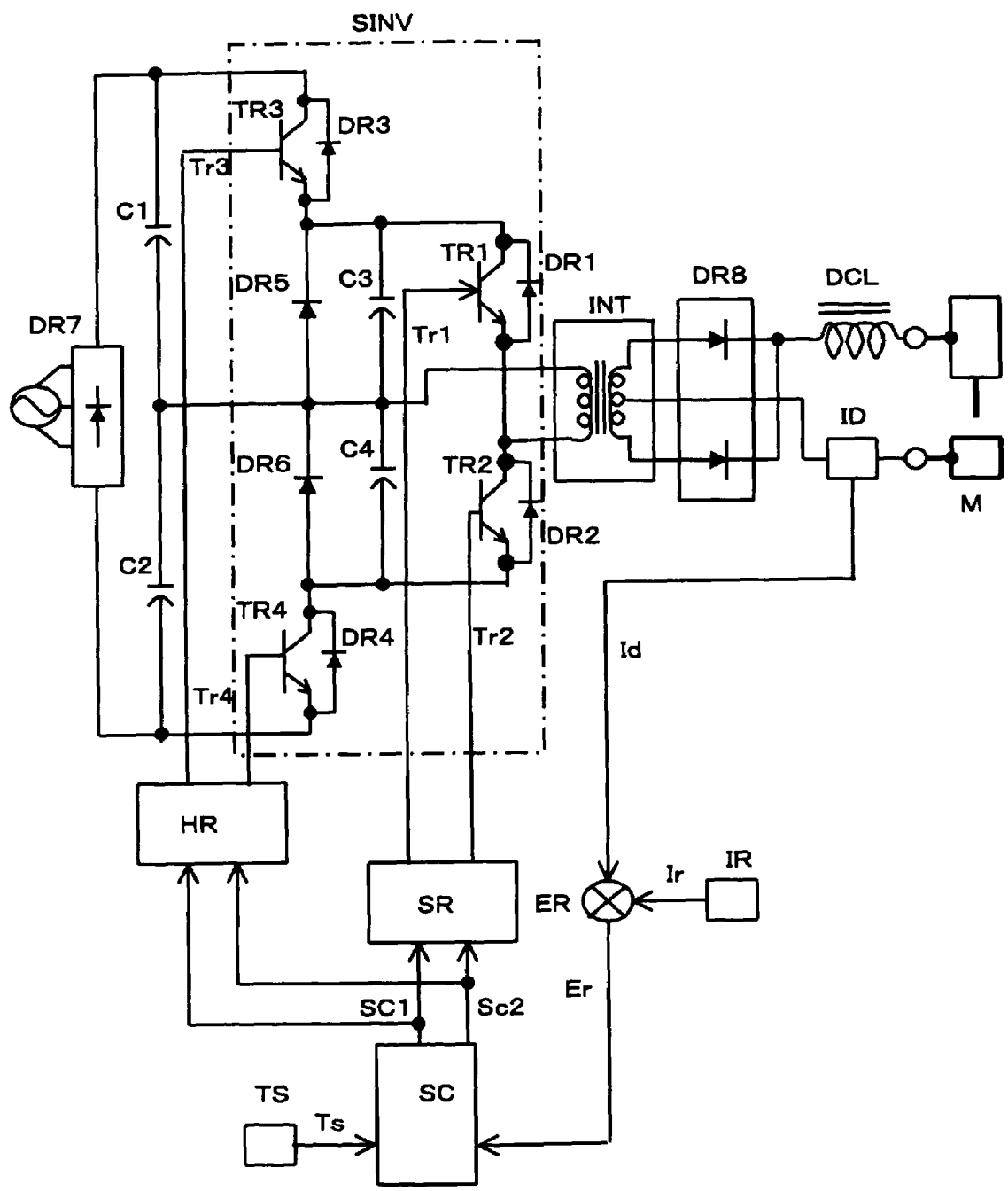
FIG. 1 is a circuit diagram showing an arc-processing power supply system according to a first embodiment of the present invention.

FIG. 1 is an electrical circuit diagram of an arc-processing power supply system according to a first embodiment of the present invention. As shown in FIG. 1, the arc-processing power supply system comprises a DC power supply circuit which includes a commercial AC power source, a primary rectifier circuit DR7, a first smoothing capacitor C1, and a second smoothing capacitor C2. The primary rectifier circuit DR7 serves to rectify the output from the commercial AC power source for conversion into DC voltage. The two smoothing capacitors C1, C2 are equal in capacitance and are arranged in series with each other to provide a smoothing circuit which is arranged in parallel to the primary rectifier circuit DR7 for smoothing the converted DC voltage.

The arc-processing power supply system also comprises a half-bridge inverter circuit SINV which includes a first switching element TR1, a second switching element TR2, a first auxiliary capacitor C3 and a second auxiliary capacitor C4. The first switching element TR1 and the second switching element TR2 are brought into and out of conduction alternately and repetitively to convert DC voltage into high-frequency AC voltage. The first switching element TR1 is paralleled by a first diode DR1, whereas the second switching element TR2 is paralleled by a second diode DR2.

The arc-processing power supply system further comprises a third switching element TR3 and a fourth switching element TR4. The third switching element TR3 and the fourth switching element TR4 are alternately brought into and out of conduction to control the supply of the DC voltage from the DC power supply circuit. When the first switching element TR1 is turned off, the second auxiliary capacitor C4 is charged with an electromotive force generated due to the energy stored in the leakage inductance of a main transformer INT. Similarly, when the second switching element TR2 is turned off, the first auxiliary capacitor C3 is charged with an electromotive force generated due to the energy stored in the leakage inductance of the main transformer INT. At this time, the electromotive force generated due to the leakage inductance of the main transformer INT may exceed the rated voltage of the third switching element TR3 and the fourth switching element TR4. However, when the charge voltage of the first auxiliary capacitor C3 or the second auxiliary capacitor C4 exceeds ½ of the smoothed DC voltage E from the DC power supply circuit, a third diode DR 3 or a fourth diode DR4 is turned on, whereby the excess charge voltage of the first auxiliary capacitor C3 or the second auxiliary capacitor C4 is bypassed to the first smoothing capacitor C1 or the second smoothing capacitor C2, thereby preventing the first auxiliary capacitor C3 or the second auxiliary capacitor C4 from suffering a high-voltage. Indicated by reference sign DR5 is a first reverse charge preventing diode, whereas reference sign DR6 is a second reverse charge preventing diode.

The first auxiliary capacitor C3 allows the third switching element TR3 and the second switching element TR2 to be switched at zero voltage, whereas the second auxiliary capacitor C4 allows the fourth switching element TR4 and the first switching element TR1 to be switched at zero voltage. After the third switching element TR3 is turned off, the first auxiliary capacitor C3 continues to discharge electricity, and the first switching element TR1 is turned off when the voltage of the first auxiliary capacitor C3 becomes zero. At this time, the voltage of the second auxiliary capacitor C4 has been zero since the second switching element TR2 was turned off a half cycle ago, so that the first switching element TR1 can be turned off at zero voltage. Similarly, after the fourth switching element TR4 is turned off, the second auxiliary capacitor C4 continues to discharge electricity, and the second switching element TR2 is turned off when the voltage of the second auxiliary capacitor C4 becomes zero. In this case, the voltage of the first auxiliary capacitor C3 has been zero since the first switching element TR1 was turned off a half cycle ago, so that the second switching element TR2 can be turned off at zero voltage. Further, owing to the provision of the first auxiliary capacitor C3 and the second auxiliary capacitor C4, the voltage applied to the third switching element TR3 and the fourth switching element TR4 becomes zero, which enables the zero-voltage switching.

The first diode DR1 and the second diode DR2 are connected in parallel to the first switching element TR1 and the second switching element TR2, respectively, at the opposite polarity. Each of these diodes bypasses the surge voltage, which is generated upon transition of the switching element from conduction to interruption, to the first auxiliary capacitor C3 or the second auxiliary capacitor C4 to prevent the application of reverse voltage.

The main transformer INT converts the high-frequency AC voltage on the primary side to a voltage suitable for arc-processing. A secondary rectifier circuit DR8 rectifies the output from the main transformer INT for conversion into DC voltage for arc-processing and supplies the voltage through a DC reactor DCL.

An output current detection circuit ID outputs an output current detection signal Id. A comparison circuit ER performs comparison between an output current setting signal Ir and an output current detection signal Id for outputting a difference signal Er=Ir−Id. An output control circuit SC performs PWM control for modulating the pulse width while keeping the pulse frequency and controls the pulse width of a first output control signal Sc1 and a second output control signal Sc2 in accordance with the difference signal Er.

Figure 2:
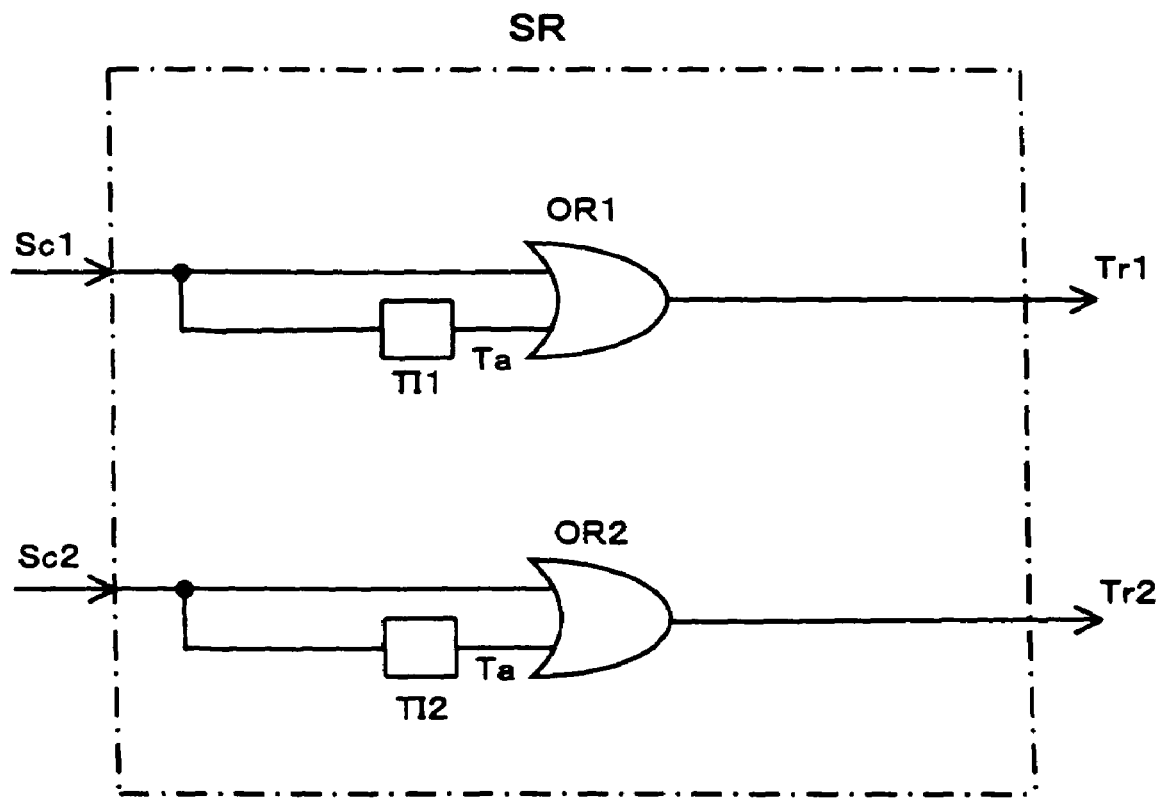
FIG. 2 is a fragmentary view showing the detailed structure of an inverter driving circuit SR incorporated in the arc-processing power supply system of FIG. 1.

As shown in FIG. 2, an inverter driving circuit SR comprises a first OR gate OR1, a second OR gate OR2, a first timer TI1 and a second timer TI2. The first timer TI1 starts upon turn-off of the first output control signal Sc1 for outputting a delay signal Ta by which the first auxiliary capacitor C3 is allowed to discharge to a predetermined level (preferably to the zero level). The first OR gate OR1 takes OR (logical sum) of the first output control signal Sc1 and the delay signal Ta for outputting a first switching drive signal Tr1. The second timer TI2 together with its associated components performs the same operation as noted above for outputting a second switching drive signal Tr2.

A power switching circuit HR outputs a third switching drive signal Tr3 and a fourth switching drive signal Tr4 in accordance with the first output control signal Sc1 and the second output control signal Sc2, respectively.

Figure 3:
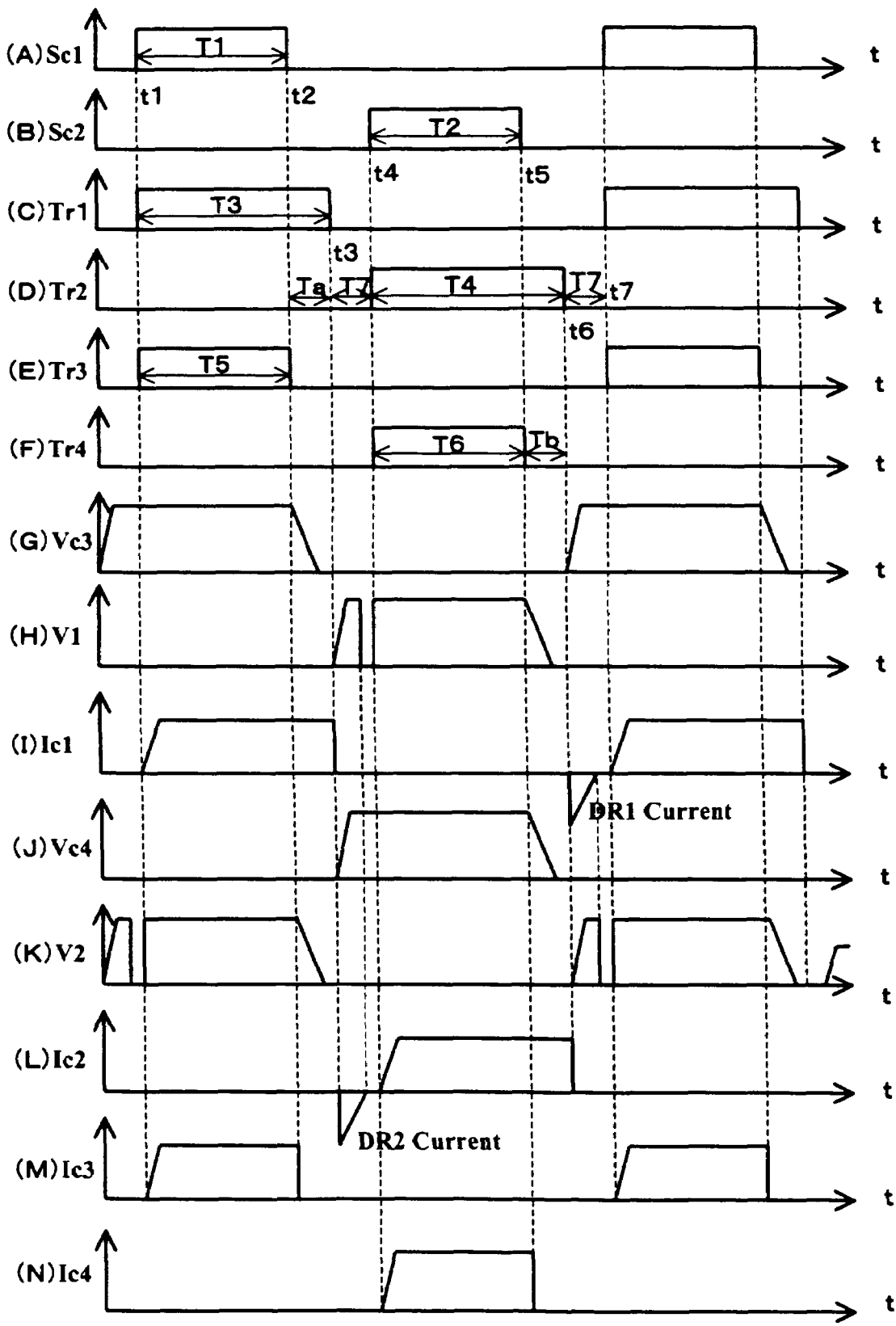
FIG. 3 is a timing chart illustrating the operation of the arc-processing power supply system shown in FIG. 1.

FIG. 3 is a waveform timing chart for describing the operation of the arc-processing power supply system according to the present invention shown in FIG. 1. FIG. 3(A) shows the waveform of a first output control signal Sc1, whereas FIG. 3(B) shows the waveform of a second output control signal Sc2. FIG. 3(C) shows the waveform of a first switching drive signal Tr1, FIG. 3(D) shows the waveform of a second switching drive signal Tr2, FIG. 3(E) shows the waveform of a third switching drive signal Tr3 and FIG. 3(F) shows the waveform of a fourth switching drive signal Tr4. FIG. 3(G) shows the waveform of terminal voltage Vc3 of the first auxiliary capacitor C3. FIG. 3(H) shows the waveform of collector-emitter voltage V1 of the first switching element TR1, whereas FIG. 3(I) shows the waveform of collector current Ic1 of the first switching element TR1. FIG. 3(J) shows the waveform of terminal voltage Vc4 of the second auxiliary capacitor C4. FIG. 3(K) shows the waveform of collector-emitter voltage V2 of the second switching element TR2, whereas FIG. 3(L) shows the waveform of collector current Ic2 of the second switching element TR2. FIG. 3(M) shows the waveform of collector current Ic3 of the third switching element TR3, whereas FIG. 3(N) shows the waveform of collector current Ic4 of the fourth switching element TR4.

At time t=t1, the first switching drive signal Tr1 is turned on (FIG. 3(C)) to shift the first switching element TR1 from interruption to conduction, and the third switching drive signal Tr3 is also turned on (FIG. 3(E)) to shift the third switching element TR3 from interruption to conduction. At this time, since the first smoothing capacitor C1 and the second smoothing capacitor C2 are made equal to each other in capacity, the terminal voltage Vc3 of the first auxiliary capacitor C3 shown in FIG. 3(G) is half of the voltage E obtained by rectifying and smoothing the output of the commercial AC power source AC. Although the collector current Ic1 of the first switching element TR1 flows as shown in FIG. 3(I), the presence of the leakage inductance in the main transformer INT prevents an abrupt increase of the collector current Ic1 of the first switching element TR1, thereby avoiding a turn-on loss of the first switching element TR1.

When the third switching drive signal Tr3 is turned off at time t=t2 as shown in FIG. 3(E), the third switching element TR3 is brought out of conduction, whereby the power supply from the first smoothing capacitor C1 to the inverter circuit is interrupted. During the conduction period T5, a saturation loss inevitably occurs at the third switching element TR3. In turning off the third switching element TR3, the first smoothing capacitor C1 and the first auxiliary capacitor C3 are generally equal to each other in charge voltage, so that the voltage applied to the third switching element TR3 is substantially zero for reducing the turn-off loss to almost zero.

At time t=t3, the first switching drive signal Tr1 is turned off as shown in FIG. 3(C) to interrupt the first switching element TR1. This interruption occurs after the lapse of a first delay period Ta in which the first auxiliary capacitor C3 is allowed to discharge to a predetermined level (preferably to the zero level), so that the terminal voltage Vc3 of the first auxiliary capacitor C3 has become almost zero. The interruption of the first switching element TR1 causes the generation of an electromotive force due to the energy of the leakage inductance of the main transformer INT. However, since the voltage of the second auxiliary capacitor C4 has been kept almost zero since the second switching element TR2 was interrupted a half cycle ago, the turn-off loss at the first switching element TR1 is almost zero. Thereafter, the second auxiliary capacitor C4 is charged with the energy of the leakage inductance of the main transformer INT. When the terminal voltage Vc4 of the second auxiliary capacitor C4 exceeds the terminal voltage ½E of the second smoothing capacitor C2, a current flows through the fourth diode DR4 for maintaining the terminal voltage Vc2 of the second auxiliary capacitor C4 at ½E.

A period T7 from time t3 to time t4 is an idle period for preventing an arm shorting current. At time t=t4, the second switching drive signal Tr2 is turned on as shown in FIG. 3(D) to shift the second switching element TR2 from interruption to conduction, while the fourth switching drive signal Tr4 is also turned on as shown in FIG. 3(F) to shift the fourth switching element TR4 from interruption to conduction. At this time, since the first smoothing capacitor C1 and the second smoothing capacitor C2 are made equal to each other in capacity, the terminal voltage Vc4 of the second auxiliary capacitor C4 shown in FIG. 3(J) is a half of the voltage E obtained by rectifying and smoothing the output of the commercial AC power source AC. Although a collector current Ic2 of the second switching element TR2 flows as shown in FIG. 3(L), the presence of the leakage inductance in the main transformer INT prevents an abrupt increase of the collector current Ic2 of the second switching element TR2, thereby avoiding a turn-on loss of the second switching element TR2.

When the fourth switching drive signal Tr4 is turned off at time t=t5 as shown in FIG. 3(F), the fourth switching element TR4 is brought out of conduction, whereby the power supply from the second smoothing capacitor C2 to the inverter circuit is interrupted. During the conduction period T6, a saturation loss inevitably occurs at the fourth switching element TR4. In turning off the fourth switching element TR4, the second smoothing capacitor C2 and the second auxiliary capacitor C4 are generally equal to each other in charge voltage, so that the voltage applied to the fourth switching element TR4 is zero, and the turn-off loss is almost zero.

At time t=t6, the second switching drive signal Tr2 is turned off as shown in FIG. 3(D) to interrupt the second switching element TR2. This interruption occurs after the lapse of a second delay period Tb in which the second auxiliary capacitor C3 is allowed to discharge to a considerable extent (preferably to the zero level), so that the terminal voltage Vc4 of the second auxiliary capacitor C4 is almost zero. The interruption of the second switching element TR2 causes the generation of an electromotive force due to the energy of the leakage inductance of the main transformer INT. However, since the voltage of the first auxiliary capacitor C3 has been kept almost zero since the first switching element TR1 was interrupted a half cycle ago, the turn-off loss of the second switching element TR2 is almost zero. Thereafter, the first auxiliary capacitor C3 is charged with the energy of the leakage inductance of the main transformer INT.

A time period T7 from time t6 to time t7 shown in FIG. 3(D) is an idle period for preventing an arm shorting current.

The arc-processing power supply system continues to operate by repeating the above-described steps. The first delay or discharge period Ta and the second delay or discharge period Tb may be made equal.

EMBODIMENT 2

Figure 4:
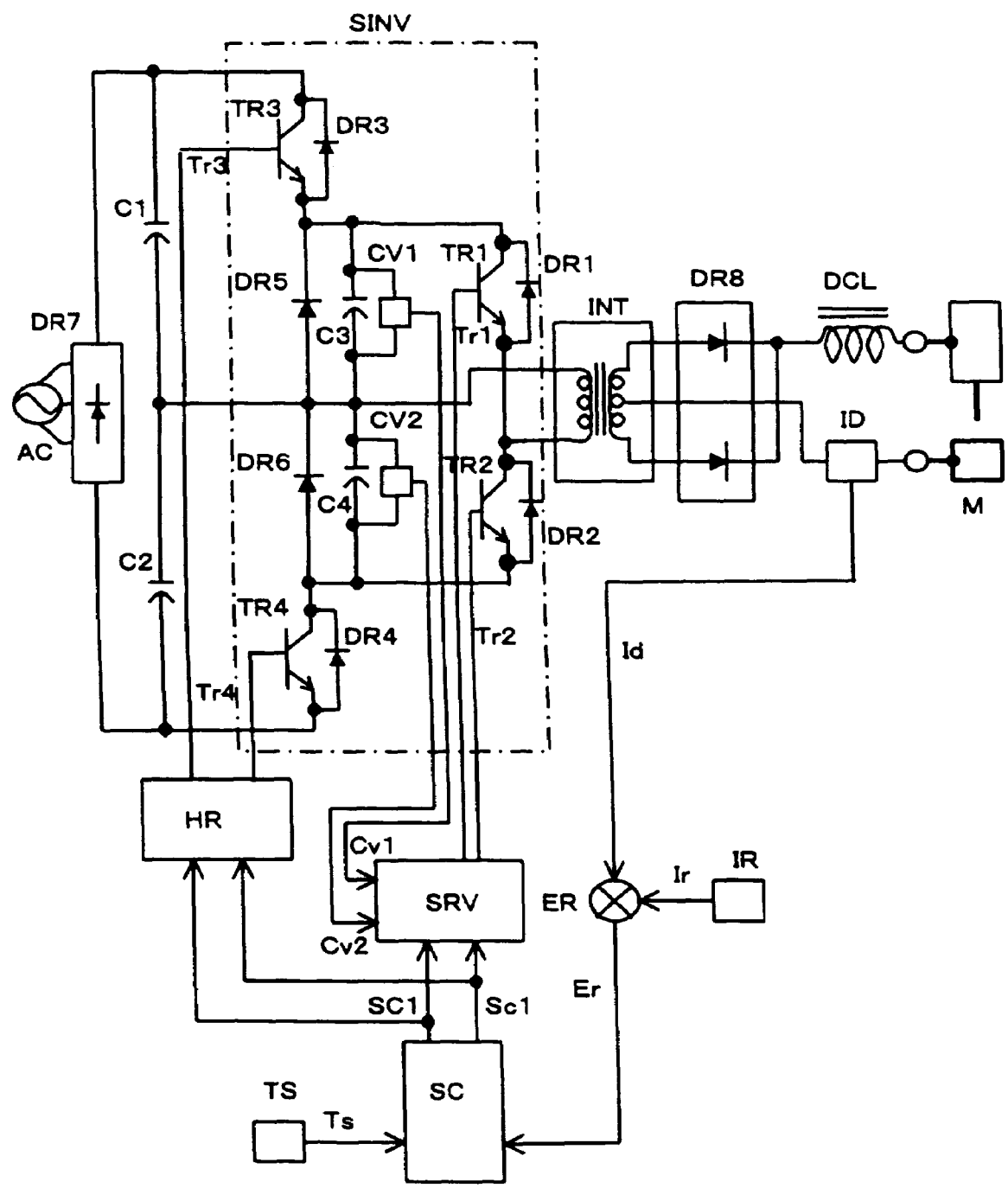
FIG. 4 is a circuit diagram showing an arc-processing power supply system according to a second embodiment of the present invention.

FIG. 4 is a circuit diagram showing an arc-processing power supply system according to a second embodiment of the present invention. The components indicated in FIG. 4 by the same reference signs as those used for the arc-processing power supply system of the first embodiment shown in FIG. 1 operate in the same manner as already described with respect to the first embodiment, and the description thereof is omitted. Only the operation which is different from that of the first embodiment will be described below.

The power supply system of the second embodiment comprises a first voltage detection circuit CV1 connected to both terminals of the first auxiliary capacitor C3, and a second primary voltage detection circuit CV2 connected to both terminals of the second auxiliary capacitor C4. The first voltage detection circuit CV1 serves to detect the discharge voltage of the first auxiliary capacitor C3 for output of a first voltage detection signal Cv1. The second primary voltage detection circuit CV2 serves to detect the discharge voltage of the second auxiliary capacitor C4 for output of a second voltage detection signal Cv2.

Figure 5:
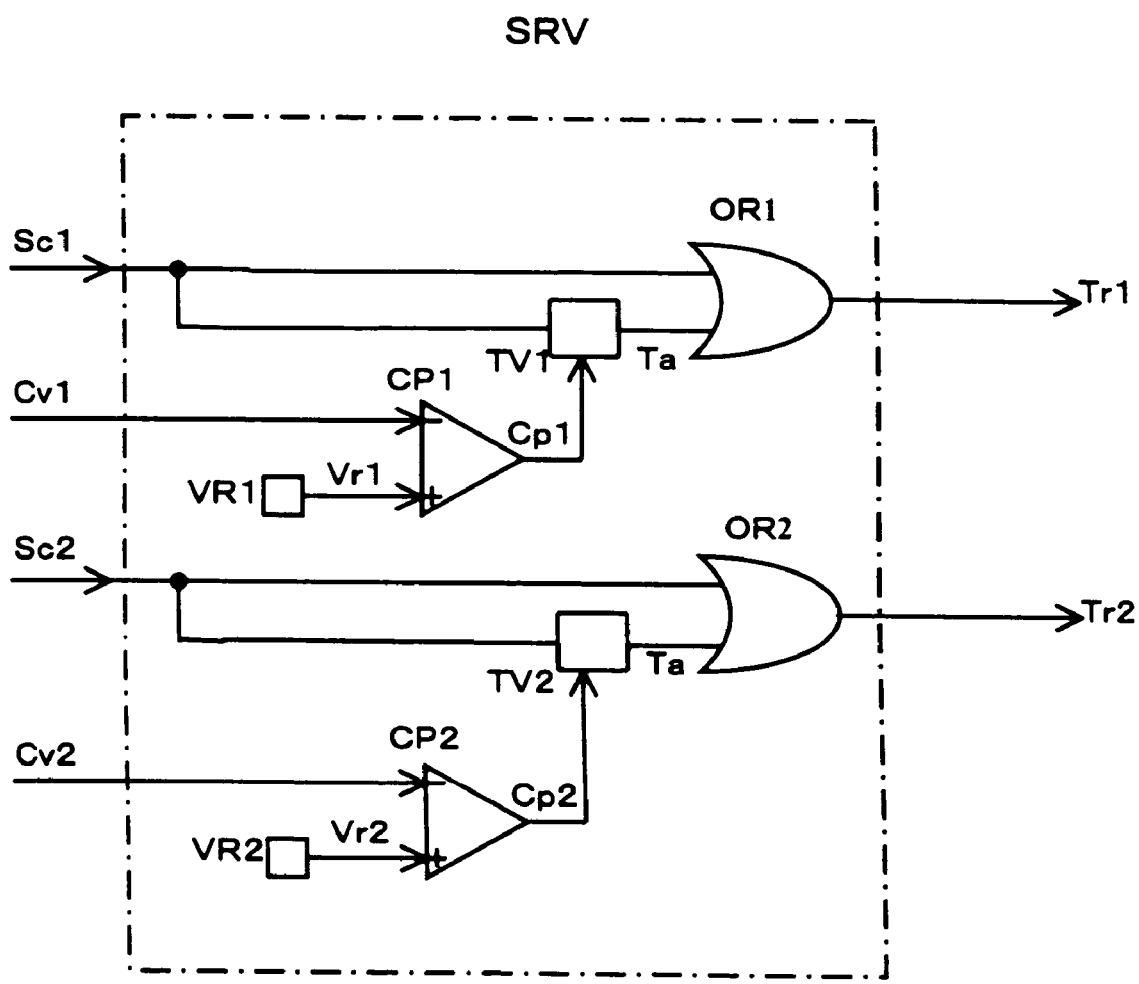
FIG. 5 is a fragmentary view showing the detailed structure of an inverter driving circuit SRV incorporated in the arc-processing power supply system of FIG. 4.

As shown in FIG. 5, an inverter driving circuit SRV is made up of a first OR gate OR1, a second OR gate OR2, a first timer TV1, a second timer TV2, a first comparator CP1, a second comparator CP2, a first reference voltage setting circuit VR1 and a second reference voltage setting circuit VR2. The first comparator CP1 compares a first primary voltage detection signal Cv1 with a first reference voltage set signal Vr1 set by the first reference voltage setting circuit VR1 and turns off the comparison signal Cp1 when the detection signal is smaller than the first reference voltage signal Vr1. The first timer TV1 starts upon turning-off of the first output control signal Sc1 for outputting a delay signal Ta which sets up a delay period wherein the first auxiliary capacitor C3 is allowed to discharge. When the first comparison signal Cp1 is turned off, the first timer TV1 stops outputting the delay signal Ta. The first OR gate OR1 takes OR (logical sum) of the first output control signal Sc1 and the delay signal Ta for outputting a first switching drive signal Tr1. The second timer TV2 together with its associated components performs the same operation as noted above for outputting a second switching drive signal Tr2.

The operation of the second embodiment shown in FIG. 4 will be described with reference to the timing chart of FIG.

3. When the first output control signal Sc1 is inputted into the inverter driving circuit SRV at time t=t1 shown in FIG. 3(A), the inverter driving circuit SRV turns on the first switching drive signal Tr1 as shown in FIG. 3(C) to shift the first switching element TR1 from interruption to conduction.

When the first output control signal Sc1 is turned off at time t=t2, the first timer TV1 shown in FIG. 5 starts generating a delay signal Ta. The first comparator CP1 compares the first primary voltage detection signal Cv1 with the first reference voltage signal Vr1 and turns off the first comparison signal Cp1 when the detection signal is smaller than the first reference voltage signal Vr1. When the first comparison signal Cp1 is turned off, the first timer TV1 stops generating the delay signal Ta.

At time t=t3, the first switching drive signal Tr1 is turned off as shown in FIG. 3(C) to interrupt the first switching element TR1. This interruption occurs after the lapse of a predetermined delay period Ta in which the first auxiliary capacitor C3 discharges almost to the zero voltage. Further, since the voltage of the second auxiliary capacitor C4 has been kept almost zero since the second switching element TR2 was interrupted a half cycle ago, the turn-off loss at the first switching element TR1 is almost zero.

EMBODIMENT 3

Figure 6:
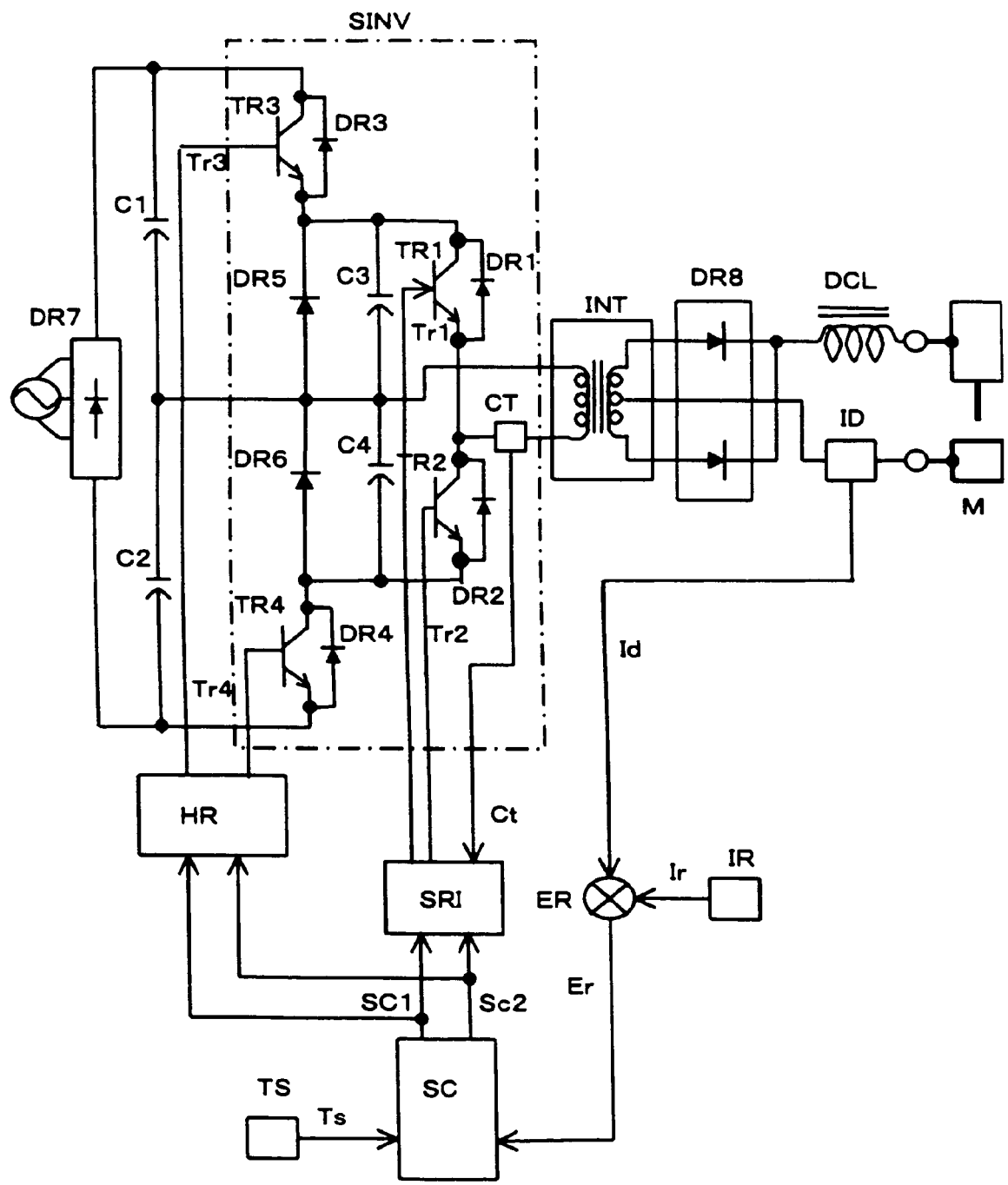
FIG. 6 is a circuit diagram showing an arc-processing power supply system according to a third embodiment of the present invention.

FIG. 6 is a circuit diagram showing an arc-processing power supply system according to a third embodiment of the present invention. The components indicated by the same reference signs as those used for the arc-processing power supply system of the first embodiment shown in FIG. 1 operate in the same manner as already described with respect to the first embodiment, and the description thereof is omitted. Only the operation which is different from that of the first embodiment will be described below.

A primary current detection circuit CT includes one terminal connected to the primary side of the main transformer INT while also including another terminal connected to an intermediate point between the first switching element TR1 and the second switching element TR2. The primary current detection circuit CT detects a primary current for output of a primary current detection signal Ct to an inverter driving circuit SRI.

Figure 7:
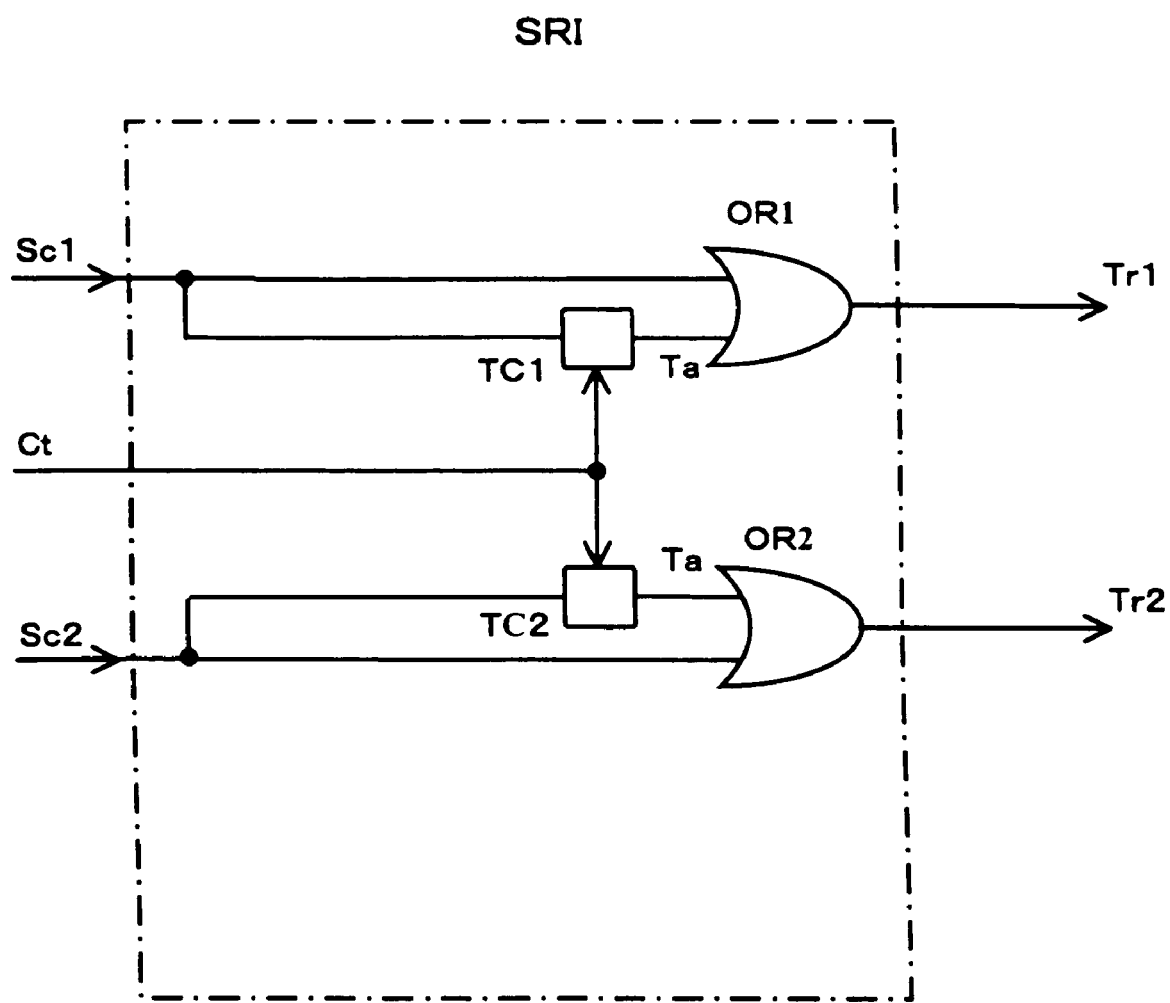
FIG. 7 is a fragmentary view showing the detailed structure of an inverter driving circuit SRI incorporated in the arc-processing power supply system of FIG. 6.

As shown in FIG. 7, the inverter driving circuit SRI comprises a first OR gate OR1, a second OR gate OR2, a first timer TC1 and a second timer TC2. The first timer TC1 starts upon turning off of the first output control signal Sc1 for outputting a delay signal Ta in accordance with the primary current detection signal Ct. The first OR gate OR1 takes OR (logical sum) of the first output control signal Sc1 and the delay signal Ta and outputs a first switching drive signal Tr1. The second timer TC2 starts upon turning off of the second output control signal Sc2 for outputting a second delay signal Ta in accordance with the primary current detection signal Ct. The second OR gate OR2 takes OR (logical sum) of the second output control signal Sc2 and the second delay signal Ta and outputs a second switching drive signal Tr2.

The operation of the third embodiment shown in FIG. 6 will be described with reference to the timing chart of FIG. 3. When the first output control signal Sc1 is inputted into the inverter driving circuit SRI at time t=t1 shown in FIG. 3(A), the inverter driving circuit SRI outputs the first switching drive signal Tr1 as shown in FIG. 3(C) to shift the first switching element TR1 from interruption to conduction.

When the first output control signal Sc1 is turned off at time t=t2 shown in FIG. 3(A), the first timer TC1 starts to generate a first delay signal Ta in accordance with the primary current detection signal Ct. The first OR gate OR1 takes OR of the first output control signal Sc1 and the first delay signal Ta and outputs a first switching drive signal Tr1, as shown in FIG. 3(C). The second timer TC2 performs the same operation as above for outputting a second switching drive signal Tr2.

EMBODIMENT 4

Figure 8:
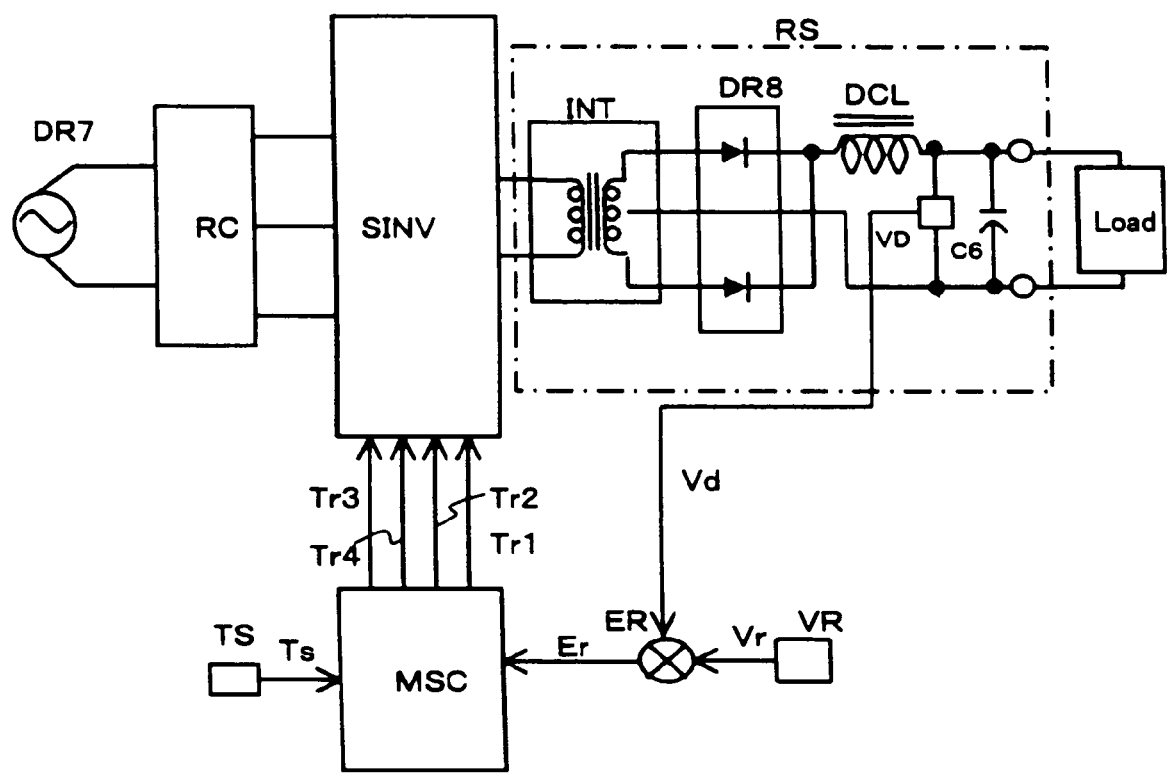
FIG. 8 is a circuit diagram showing a soft-switching half-bridge inverter circuit as incorporated in a switching power supply system according to a fourth embodiment of the present invention.

FIG. 8 is a circuit diagram showing a soft-switching half-bridge inverter circuit SINV as used in a switching voltage regulator which is a typical example of inverter power supply system. The components indicated in FIG. 6 by the same reference signs as those used for the first embodiment shown in FIG. 1 operate similarly to the first embodiment, and the description thereof is omitted. Only the operation which is different from that of the first embodiment will be described below.

A DC power supply circuit includes a commercial AC power source, a primary rectifier circuit DR7, and a DC smoothing circuit RC. The DC smoothing circuit RC includes two smoothing capacitors which are equal in capacitance, similarly to the first embodiment shown in FIG. 1.

The soft-switching half-bridge inverter circuit SINV shown in FIG. 8 has the same structure as the half-bridge inverter circuit SINV shown in FIG. 1. Therefore, the details of the inverter circuit SINV are not shown in FIG. 8.

The switching voltage regulator shown in FIG. 8 also comprises a rectifier/smoothing circuit RS which includes a main transformer INV, a secondary rectifier circuit DR8, a DC reactor DCL, and a secondary smoothing capacitor C6 connected to a load. In operation, the high-frequency AC voltage from the half-bridge inverter circuit SINV is transformed at the main transformer INV to have a predetermined voltage, and the transformed voltage is rectified and smoothed at the secondary rectifier circuit DR8, the DC reactor DCL and the secondary smoothing capacitor C6, respectively, for conversion into a DC voltage from which ripple components have been removed for supply to the load.

An output voltage detection circuit VD detects the secondary DC voltage for output of a secondary voltage detection signal Vd. A comparison circuit ER performs comparison between an output voltage setting signal Vr and the voltage detection signal Vd to output a difference signal Er=Vr−Vd. Similarly to the first embodiment A shown in FIG. 1, a main control circuit MSC includes an output control circuit SC, an inverter driving circuit SR and a power switching circuit HR for controlling output of a first switching drive signal Tr1, a second switching drive signal Tr2, a third switching drive signal Tr3 and a fourth switching drive signal Tr4 in accordance of the difference signal Er, thereby performing constant voltage control.

The switching voltage regulator shown in FIG. 8 operates substantially in the same manner as the arc-processing power supply system shown in FIG. 1, except that control of the half-bridge inverter circuit SINV is based on the voltage detection signal Vd instead of the current detection signal for providing voltage regulation.

EMBODIMENT 5

Figure 9:
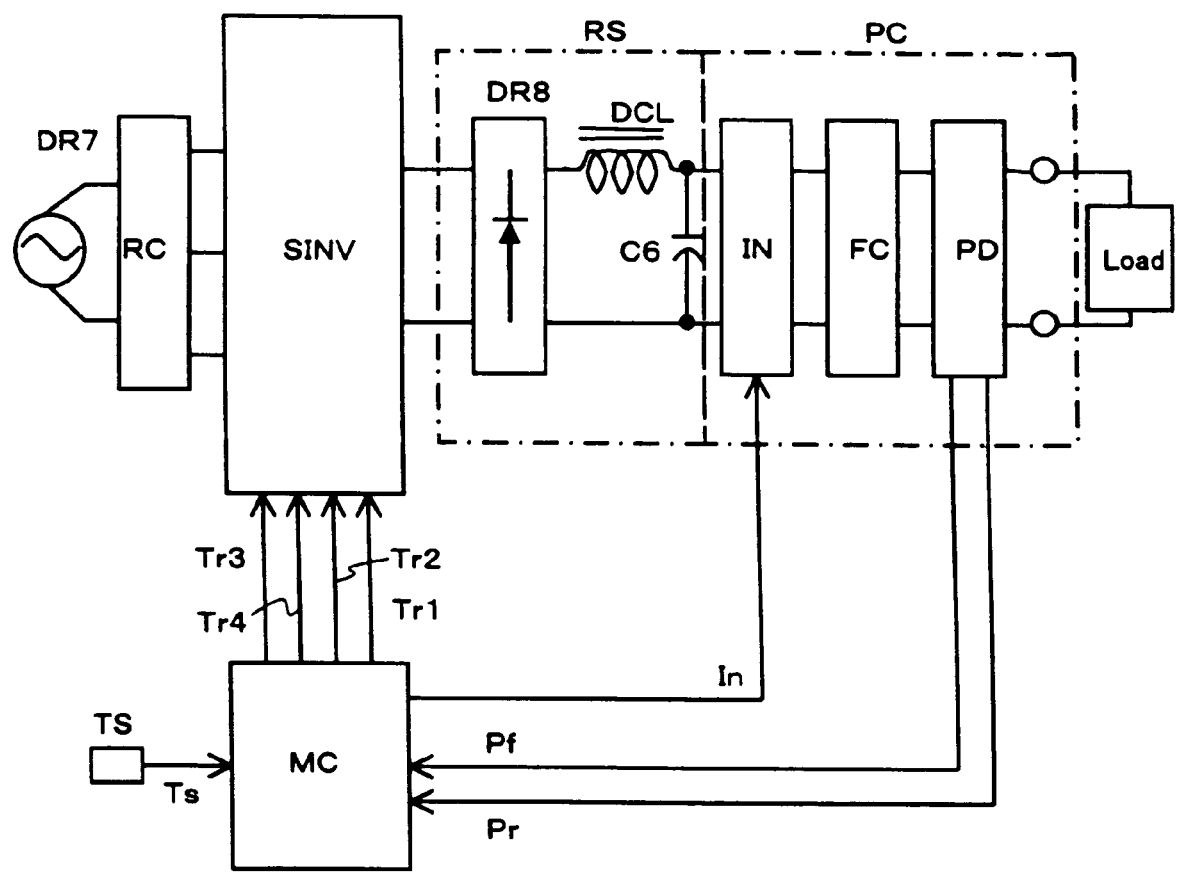
FIG. 9 is a circuit diagram showing a soft-switching half-bridge inverter circuit as incorporated in a high-frequency power supply system according to a fifth embodiment of the present invention.
Figure 10:
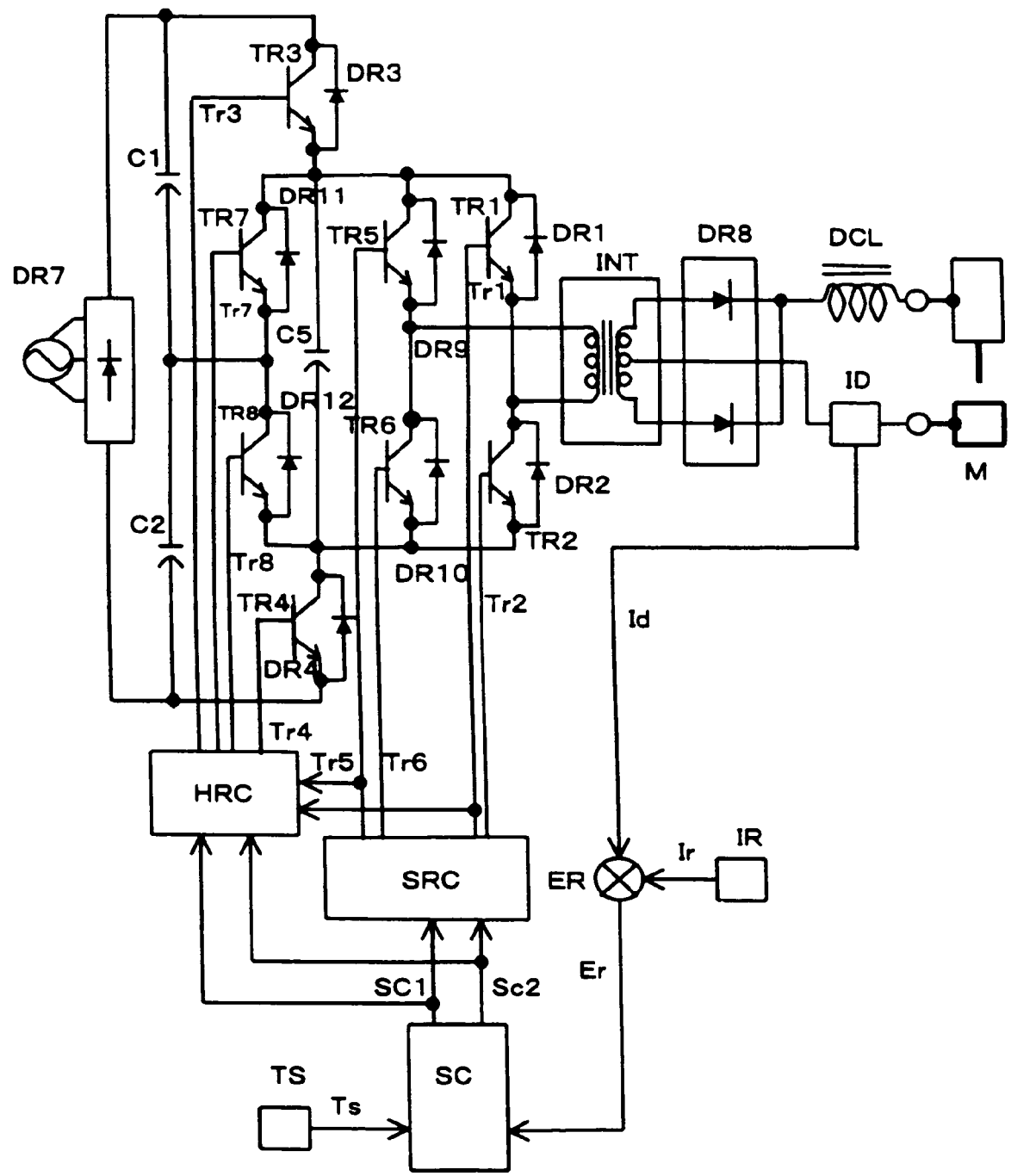
FIG. 10 is a circuit diagram showing a prior art arc-processing power supply system.

FIG. 9 is a circuit diagram showing a soft-switching half-bridge inverter circuit SINV as used in a high-frequency power supply system for supplying power to a plasma processing apparatus in manufacturing semiconductors. The components indicated in FIG. 9 by the same reference signs as those used for the first embodiment shown in FIG. 1 operate similarly to the first embodiment, and the description thereof is omitted. Only the operation which is different from that of the first embodiment will be described below.

The high-frequency power supply system shown in FIG. 9 comprises a rectifier/smoothing circuit RS which is made up of a secondary rectifier circuit DR8, a DC reactor DCL and a secondary smoothing capacitor C6 for rectifying and smoothing the high-frequency AC voltage (with an output frequency of about 10 KHz, for example) outputted from the soft-switching half-bridge inverter circuit SINV to provide a DC voltage from which ripple components have been removed.

The high-frequency power supply system also comprises a power conversion circuit PC which includes an inverter circuit IN, a filter circuit FC and a power detection circuit PD. The inverter circuit IN converts the DC voltage from the rectifier/smoothing circuit RS into high-frequency AC voltage (with an output frequency of no lower than 100 KHz, for example). The filter circuit FC is generally made up of an inductor and a capacitor (not shown) for attenuating high-frequency components contained in the voltage outputted from the inverter circuit IN to output high-frequency AC voltage of a sinusoidal waveform. The power detection circuit PD compares the traveling wave power (to be absorbed by the load) to be supplied from the power conversion circuit PC to the load, with the reflective wave power reflected by the load and returned to the power conversion circuit PC when impedance matching is not achieved between the power conversion circuit PC and the load. Further, the power detection circuit PD inputs a traveling wave power detection signal Pf corresponding to the detected traveling wave power and a reflective wave power detection signal Pr corresponding to the detected reflective wave power, into a control circuit MC.

The soft-switching half-bridge inverter circuit SINV controls the power to be supplied to the inverter circuit IN. Similarly to the first embodiment shown in FIG. 1, the control circuit MC controls the half-bridge inverter circuit SINV and includes an PMW output control circuit SC, an inverter driving circuit SR and a power switching circuit HR for controlling output of a first switching drive signal Tr1, a second switching drive signal Tr2, a third switching drive signal Tr3 and a fourth switching drive signal Tr4, based on the traveling wave power detection signal Pf and the reflective wave power detection signal Pr.

The soft-switching half-bridge inverter circuit SINV shown in FIG. 9 operates similarly to the soft-switching half-bridge inverter circuit of each of the foregoing embodiments, so that the description thereof is omitted.

The control circuit MC for controlling the soft-switching half-bridge inverter circuit SINV can be provided by slightly modifying a conventional control circuit. In this way, the soft-switching half-bridge inverter circuit SINV can be used easily in place of the existing inverter section of a high-frequency power supply system for supplying a predetermined traveling wave power to the load of a plasma processing apparatus.

MODIFICATIONS

As modifications of the foregoing embodiments, the circuit arrangements shown in FIGS. 4 and 5 may be employed in each of the fourth and fifth embodiments shown in FIGS. 8 (showing a switching voltage regulator) and 9 (showing a high-frequency power supply system). Specifically, the soft-switching half-bridge inverter circuit SINV shown in FIG. 8 or 9 may be modified so that a first voltage detection circuit CV1 (FIG. 4) is connected to both terminals of the first auxiliary capacitor C3 for detecting the discharge voltage of the first auxiliary capacitor C3 and outputting as a first voltage detection signal Cv1, and a second voltage detection circuit CV2 (FIG. 4) is connected to both terminals of the second auxiliary capacitor C4 for detecting the discharge voltage of the second auxiliary capacitor C4 and outputting a second voltage detection signal Cv2.

The present invention being thus described with reference to the preferred embodiments, it is obvious that the same may be varied in many ways. Such variations are not to be regarded as a departure from the spirit and scope of the present invention, and also such variations as would be obvious to those skilled in the art are intended to be included in the scope of the appended claims.

The invention claimed is:

1. An inverter power supply system comprising:
 a DC power supply circuit for outputting a smoothed DC voltage;
 a half-bridge inverter circuit for converting the DC voltage from the power supply circuit to an AC voltage, the inverter circuit including a first switching element, a second switching element, a first auxiliary capacitor and a second auxiliary capacitor for converting the DC voltage from the power supply circuit to an AC voltage;
 an output control circuit for outputting a first output control signal and a second output control signal with a phase difference of a half cycle to control the inverter circuit;
 a power output circuit for converting the AC voltage from the inverter circuit into an output power;
 a third switching element provided between a positive side of the DC power supply circuit and the inverter circuit for interruptively supplying the DC voltage to the first switching element;
 a fourth switching element provided between a negative side of the DC power supply circuit and the inverter circuit for interruptively supplying the DC voltage to the second switching element;
 a power switching circuit for bringing the third switching element into and out of conduction in response to an ON/OFF state of the first output control signal while also bringing the fourth switching element into and out of conduction in response to an ON/OFF state of the second output control signal; and
 an inverter driving circuit for turning on the first switching element when the first output control signal turns ON while turning off the first switching element upon lapse of a first delay time for allowing the first auxiliary capacitor to discharge to a predetermined level after the first output control signal turns OFF, the inverter driving circuit also turning on the second switching element when the second output control signal turns ON while turning off the second switching element upon lapse of a second delay time for allowing the second auxiliary capacitor to discharge to a predetermined level after the second output control signal turns OFF.

2. An inverter power supply system according to claim 1, wherein the inverter driving circuit comprises a first delay circuit for setting the first delay time, and a second delay circuit for setting the second delay time.

3. An inverter power supply system according to claim 2, wherein the inverter driving circuit further comprises a first OR circuit which supplies an ON signal to the first switching element if the first control signal or a first delay signal from the first delay circuit is ON, the first delay circuit starts generating the first delay signal when the first control signal turns OFF, the inverter driving circuit further comprising a second OR circuit which supplies an ON signal to the second switching element if the second control signal or a second delay signal from the second delay circuit is ON, and the second delay circuit starts generating the second delay signal when the second control signal turns OFF.

4. An inverter power supply system according to claim 2, further comprising a first voltage detector for detecting a discharge voltage across the first auxiliary capacitor, and a second voltage detector for detecting a discharge voltage across the second auxiliary capacitor, wherein the first delay circuit starts generating a first delay signal when the first control signal turns OFF while stopping generation of the first delay signal when the first discharge voltage becomes no more than a first threshold, the second delay circuit starts generating a second delay signal when the second control signal turns OFF while stopping generation of the second delay signal when the second discharge voltage becomes no more than a second threshold.

5. An inverter power supply system according to claim 2, further comprising a current detector for detecting a primary current outputted from the inverter circuit, wherein the first delay circuit and the second delay circuit determines the first delay time and the second delay time, respectively, according to a value of the detected primary current.

6. An inverter power supply system according to claim 1, further comprising a first reverse charge preventing diode arranged between an intermediate point of the DC power supply circuit and an emitter side of the third switching element for preventing the first auxiliary capacitor from being reversely charged, and a second reverse charge preventing diode arranged between the intermediate point of the DC power supply circuit and a collector side of the fourth switching element for preventing the second auxiliary capacitor from being reversely charged.

7. An inverter power supply system according to claim 1, wherein the power output circuit comprises a main transformer for transforming the AC voltage from the inverter circuit into a high-frequency AC voltage, and a secondary rectifier circuit for rectifying the high-frequency AC voltage from the main transformer to provide an output DC voltage suitable for supply to a target load.

8. An inverter power supply system according to claim 7, further comprising a secondary current detector for detecting a secondary current outputted from the main transformer, wherein the output control circuit generates the first and second control signals based on the detected secondary current from the secondary current detector.

9. An inverter power supply system according to claim 7, further comprising a secondary voltage detector for detecting a secondary voltage across the load, wherein the output control circuit generates the first and second control signals based on the detected secondary voltage from the secondary voltage detector.

10. An inverter power supply system according to claim 1, wherein the power output circuit comprises a secondary rectifier/smoothing circuit for rectifying and smoothing the AC voltage from the inverter circuit to provide a DC voltage from which ripple components have been removed, and a power conversion circuit for converting the DC voltage from secondary rectifier/smoothing circuit into output power suitable for a target load.

11. An inverter power supply system according to claim 10, wherein the power conversion circuit comprises a power detection circuit for detecting traveling wave power absorbed by the load and reflective wave power reflected by the load, the output control circuit generating the first and second output signals based on the traveling wave power and the reflective wave power from the power detection circuit.

* * * * *